United States Patent Office 3,154,381
Patented Oct. 27, 1964

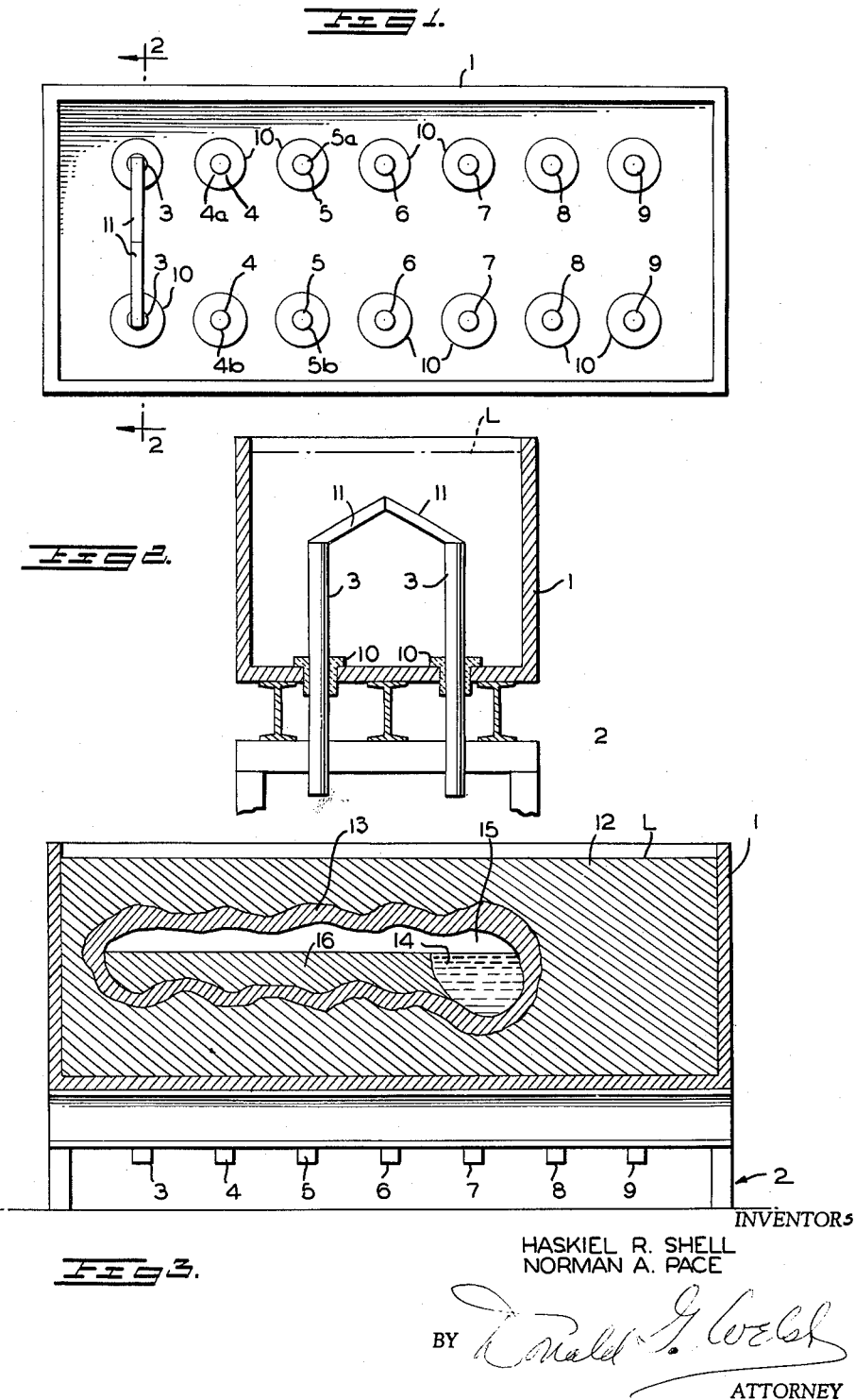

3,154,381
PROGRESSIVE MELTING AND CRYSTALLIZATION OF SYNTHETIC MICA
Haskiel R. Shell and Norman A. Pace, Norris, Tenn., assignors to the United States of America as represented by the Secretary of the Interior
Filed Apr. 20, 1959, Ser. No. 807,737
6 Claims. (Cl. 23—110)
(Granted under Title 35, U.S. Code (1952), sec. 266)

The invention herein described and claimed may be manufactured and used by or for the Government of the United States of America for governmental purposes without the payment of royalties therein or therefor.

This invention relates to a method and apparatus for the production of crystals by melting and solidifying batches of starting ingredients. More particularly, it is concerned with a method and apparatus for preparing synthetic mineral crystals, especially crystals of synthetic fluorine mica.

The production of synthetic minerals in an electric furnace, wherein the batch of ingredients serves as the container for the melt is described in U.S. Patent 2,711,435. While this method is successful in containing the melt and minimizing volatilization of components, the mineral crystals produced are generally of small dimensions.

Even with melts up to 10 tons made by this technique, only very small amounts of large single crystal sheets were obtained. Yet it is precisely this single sheet mica which is in such demand for use in vacuum tubes and capacitors, because of the superior heat resisting and vacuum retaining properties of the synthetic sheet mica as compared to natural sheet mica.

Without being bound to any theory, among the reasons which can be assigned to the tendency of the prior art method to form small rather than large crystals are:

(1) Too rapid cooling of the melt for optimum crystallization.

(2) Since crystallization takes place from all sides toward the center, resulting in excessive nucleation, pressure may develop which is sufficient to warp already formed crystals.

(3) Impurities in the melt, such as $Na^+$, $Ca^{++}$, and excess $F^-$ become concentrated at the center and interfere with optimum crystallization.

(4) The melt is in a static condition with respect to the growing crystals, so that impurities or even excessive amounts of reactants build up in the path of the growing crystals, sufficiently to induce twinning, "fish scaling" and/or secondary phases, which prevent continued growth of a single crystal sheet.

It is an object of this invention, accordingly, to provide an improved method and apparatus for the production of crystals by melting and solidification.

It is another object of this invention to maintain the melt in a molten state sufficiently long for optimum crystallization to take place.

A further object of this invention is to provide an improved method for the production of crystals from a batch of ingredients wherein a melt is formed within the body of the batch of ingredients, the batch of materials acting as a heat insulator and as a vapor barrier.

It is a further object of this invention to prevent the concentration of impurities in the melt such as would interfere with optimum crystallization.

It is a further object of this invention to maintain the melt in a progressive motion with respect to the growing crystals so as to avoid any build-up of impurities in he path of crystal growth.

A further object of the invention is to provide a method for purifying crystalline material employing a system of progressive melting within the interior of a batch of said material.

Another object of the invention is to provide a method and apparatus for the production of synthetic mineral crystals of greater size by forming a melting zone within a body of starting materials, and passing the melting zone through the material.

A further object of this invention is to increase the size of the melt by adding additional batch material directly to the molten mass during the early stages of melting.

It is a further object of this invention to provide an electric furnace having a plurality of pairs of electrodes covered by starting materials forming a melting zone between one pair of electrodes, and passing the melting zone through the batch between the other pair of electrodes.

These and other objects of the invention will become apparent from the following description taken in connection with the accompanying drawings, in which:

FIG. 1 shows a plan view of the furnace, shown as it would appear without its charge;

FIG. 2 is a cross-section taken along lines 2—2 of FIG. 1;

FIG. 3 is a schematic longitudinal cross-sectional view through the furnace, showing the solidified and molten portions of the mineral melt located within the interior portion of the batch.

Our invention consists, briefly, in placing a charge of starting material in an electric furnace having a plurality of pairs of electrodes, completely surrounding the electrodes with the charge, and starting a conducting melt within the interior of the charge by resistance heating between the first pair of electrodes. When the conducting melt reaches the adjacent second pair of electrodes, power is cut off from the first pair and led to the second pair. The melt adjacent the first pair starts to cool and crystallize. Meanwhile, the melt surrounding the second pair grows until it reaches the third pair of electrodes, whereupon the process of cutting off power between one pair and leading power to the next pair is repeated. At the end of the cycle of operations, a bed of crystallized material is formed within the interior of the batch, the crystals being of greater length and higher quality than those obtained by the single pair of electrodes method of the prior art.

Referring to the drawings for a more complete description of the device, and more particularly FIGS. 1 and 2, the apparatus comprises a shell 1 which may be of any desired material of construction, such as sheet metal or refractory brick, for example. The only essential requirement is that shell 1 be strong enough to support the weight of the charges, since thermal insulation is supplied by the unfused charge material. Conventional cooling means (not shown) may be provided for shell 1, which is supported on a base 2 formed of framework of I beams supported by corner columns. A plurality of pairs of vertical electrodes 3, 4, 5, 6, 7, 8, and 9 extend upwardly through the bottom of shell 1, as shown in FIG. 2. Insulators 10, which may be ceramic or any other suitable insulating material, surround the electrodes at the bottom of the shell. The electrodes may be made of graphite, carbon, or any other suitable conducting material. The mixed batch of starting ingredients 12 (FIG. 3) is tamped in place in the shell, surrounding the electrodes, to a level indicated at L in FIG. 2. A resistor 11, which may be two thin rods of graphite or carbon touching each other, as shown in FIG. 2, or other suitable resistance means such as a graphite train, is laid in the batch between the first pair of electrodes 3, to allow A.C. power to pass between them when starting up. Thin rods 11 which extend from the ends of vertical electrodes 3, are angularly disposed relative to their supporting electrodes, such that their unsupported ends face each other. The exemplary arrangement of FIG. 2, shows the rods at an angle of approximately 30° to the horizontal. Means, not shown, including switches, connect the electrodes to a source of A.C. power, by any of the methods well known to the art.

Starting the melt and continuation of electrical resistance melting to produce a molten pool around the first pair of electrodes 3 is as described in U.S. Patent 2,711,435. As set forth in that patent, the pool is surrounded by a thick shell of sintered material 13 (FIG. 3), formed within the charge which acts as a vapor barrier, minimizing the loss of volatile constituents, while the rest of the batch acts as a thermal insulator for the melt.

Melting is continued until the pool of conducting material contacts the second pair of electrodes 4, whereupon power is discontinued through electrodes 3 and passed through 4. The portion of the batch adjacent to electrode 4, which includes sintered material, is then melted. When the melt contacts electrodes 5, power is passed through these, and discontinued through electrode pair 4. Alternatively, when the melt contacts electrodes 5a power can be passed through the opposite one electrode 4b and the said one electrode 5a. When the melt contacts electrode 5b the power is switched to it from opposite electrode 4b. This method, of course, can be applied to all of the electrode pairs and is not limited to electrode pairs 4 and 5. Another way by which the melting zone may be advanced through the batch is to provide each set of electrodes with a graphite resistor or graphite train. A melt can then be started between the next electrode pair before the already existing melt reaches them.

As shown in FIG. 3, the melt 14 is located in a melting zone 15. The process whereby the melting zone is advanced from electrode pair to electrode pair through the batch is denoted herein as "progressive melting." The process of progressive melting is continued through the batch until electrode pair 9 is reached, when the operation is halted. As the melt progresses, that portion located at the electrode pair where the power had been cut off starts to cool and crystallize. It is believed apparent therefore, that crystallization advances behind the melting zone through the furnace.

The size of the melt is controlled by the power input, the distances between the electrodes and the heating time. The operator can determine when the melt volume has reached the proper size, e.g., reached the adjacent pair of electrodes, by thermocouples placed within batch at strategic locations, by experience on the basis of past performances, by resistivity readings taken through the electrodes, or by the temperature of the furnace or container wall. At the proper time the power input is cut off to one pair of electrodes, allowing the melt to cool and crystallize, and started at the adjacent pair.

FIG. 3 shows a typical cross-section through the furnace during the melting operation, after the melting zone 15 has proceeded to electrode pair 7, forming melt 14. When the furnace is employed for producing mineral crystals, as for example synthetic fluorine mica, sintered shell 13 which acts as a vapor barrier, has a hard marble-like structure, and forms at a lower temperature than the melt. Solidified, crystallized melt 16 forms after power input to this electrode pair is halted.

Although the ends of the electrodes above the melt are consumed, the stubs in the melt are adequate to transmit the melting current. The substantial thickness of batch material 12 is sufficient to adequately insulate the furnace walls. After the melting zone has been extended to the last pair of electrodes, and the melt allowed to solidify, the crystalline mass 16 is removed, and the remaining material may be crushed for reuse.

If desired, the melt size may be increased by adding additional batch material to the melt. This is done by making a small hole in the shell 13 above the melt during the early stages of melting and injecting mixed batch material directly into the molten mass.

The herein described method presents several unique and important advantages. First, except at the last pair of electrodes in the furnace described, the melt is always crystallizing toward a liquid mass that is open and not completely enclosed by crystals, as in the prior art. Therefore, no pressure is developed and warping of crystals is eliminated. Secondly, the rate of advance of crystallization, and therefore the rate of crystal growth, is controlled by the power input to the furnace. The more favorably located seed crystals will have both time and space in which to grow and eliminate the non-oriented crystallization. Thirdly, impurities such as $Na^+$ or $Ca^{++}$, or any excess constituent of the batch such as $F^-$ will be concentrated in the liquid as the melting zone moves through the furnace. They are kept in motion in the melt by the resistance heating and thus cannot concentrate at the growth face of the crystal in sufficient amounts to impair the development of large single crystals. This method may therefore be employed for purifying crystalline materials of suitable melting points. Fourthly, power input per pound of mica is less, and fewer man-hours of labor required per pound of mica, than with the prior art process. Because the impurities are concentrated in the liquid of the melt and do not affect the crystals, it is possible to introduce ions such as excess $F^-$ for various auxiliary beneficial purposes, without deleterious effects. For example, if it should be regarded as advantageous to have a 50% excess of $F^-$ present, this excess need be placed only near the starting electrode. As the melting zone progressed, the excess $F^-$ is moved along with it and is found finally at the terminal electrodes.

It is evident that many variations may be made in the furnace design without altering the essentials of the operation. While the electrode pairs shown in the drawing are arranged in two straight rows, other spacings may be employed. They may be placed in a single row down the center of the furnace, in which case two adjacent electrodes are on power, and the melting zone is advanced by cutting off power to the rear electrode and feeding power to the next adjacent downward electrode. If desired, power may be applied to more than one pair of electrodes. While in the modification shown the electrodes enter the furnace from the bottom, they could be from the sides as in U.S. Patent 2,711,435, or by suitable arrangement, from the top. The sizes of the furnace may be varied, depending on the quantity of product desired. With sufficient control of impurities, continuous operation may be achieved by making the furnace circular and having a circular arrangement of the electrodes. Crystallized material could then be removed and fresh material and electrodes replaced without halting the operation of the furnace.

The batch materials employed may consist of any single ingredient or material, or mixtures of materials required to produce the fusion product. This invention is especially suited for the production of synthetic fluorine mica of the generic formula $X_{1/2-1}Y_{2-3}Z_4O_{10}(F)_2$, wherein X may be $K^+$, $Na^+$, $Rb^+$, $Tl^+$, $Cs^+$, $Ca^{++}$, $Si^{++++}$, $Ba^{++}$, and $Pb^{++}$; Y may be $Mg^{++}$, $Fe^{++}$, $Ca^{++}$, $Ni^{++}$, and combinations of $Mg^{++}$ with $Mn^{++}$, $Li^+$, $Ti^{++}$, $Zn^{++}$, or $Cu^{++}$; Z may be $Si^{++++}$, $Ge^{++}$, or a combination of $Si^{++++}$ with $Al^{+++}$, $Be^{++}$, $B^{+++}$, $V^{+++}$, or $Cr^{+++}$.

One especially suitable mica which may be produced by this process is fluorphlogopite mica, $KMg_3AlSi_3O_{10}F_2$, which may be made from a suitably proportioned mixture of $K_2SiF_6$, feldspar or $K_2CO_3$, MgO, $Al_2O_3$ and $SiO_2$. Usually a small excess of fluoride component is added to compensate for any that may be lost by volatilization, or for the prevention of the precipitation of forsterite, $Mg_2SiO_4$. Optimum proportions of each ingredient are best determined by experiment.

The invention is illustrated by the following examples, which are not to be construed as limiting its scope.

*Example 1*

A one ton batch of ingredients was prepared with the quantities and materials employed as follows; corresponding to the formula

| Material | Mol Ratio | Anhydrous, Percent by Weight |
|---|---|---|
| $K_2SiF_2$ | 0.75 | 19.23 |
| $K_2CO_3$ | 0.25 | 4.02 |
| MgO | 6.0 | 28.16 |
| $Al_2O_3$ | 1.0 | 11.87 |
| $SiO_2$ | 5.25 | 36.72 |

The mixture was placed in the furnace similar to that described herein, except that ten 2-inch graphite electrodes were used, and the progressive melting technique was employed. The results showed the feasibility of this mode of operation.

Other materials such as feldspar, $K_2O \cdot Al_2O_3 \cdot 6SiO_2$; $KAlF_4$; $MgF_2$, etc. may be employed, the molar ratios being suitably proportioned.

Example 2

A 2400 pound batch similar in composition to that in Example 1 was charged into the furnace described, and the progressive melting technique employed. After cooling, the melt was removed. The resulting fluorphlogopite mica crystals were clearer and freer of contamination than any known heretofore. Oriented growths of clear single crystals up to 4 inches in length were obtained.

This experiment demonstrated that oriented growths of large crystals could be obtained and that impurities present in the melt did not interfere with the crystallization.

Example 3

Fourteen tons of mica batch material, similar to that of Example 1, were employed in a furnace similar to that described. Of this quantity, almost eight to nine tons were melted during the process. Oriented, nearly parallel crystal growths of synthetic fluorphlogopite up to 16 inches in length were obtained containing crystal up to 3 inches in length.

The method may be employed for the synthesis of other fluorine micas as well as mineral products such as fluoramphiboles, for example fluor-tremolite, calcium fluoride, and potassium magnesium fluoride. Although the method is particularly useful when applied to batch containing a volatile component such as fluoride, it may also be used for the synthesis of non-volatile compositions of superior crystal quality such as, for example, cordierite

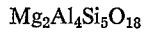

beta spodumene, $LiAlSi_2O_6$; wollastonite, $CaSiO_3$; or monticellite, $CaMgSiO_4$.

While the examples show preparing mineral crystals of high purity and appreciable size, the same method can be employed in the purification of crystalline material which is capable of forming a conducting melt. A batch of material to be purified is placed in the furnace in subdivided form, and the above described progressive melting technique employed. Impurities become concentrated in the liquid as the melting zone advances through the batch, the recrystallized material being of enhanced purity.

Crystal size is affected by the size of the furnace and the quantity of batch employed. Optimum sized crystals are obtained through the use of larger batches.

Although only resistance heating has been shown, other forms of heating wherein the melt is formed within the interior of a batch may be employed. For example, induction heating may be employed wherein the furnace walls are of a non-conducting refractory, and the batch is packed about a graphite core rod. Induced current in the rod causes it to melt the surrounding batch. The heating zone may be moved along the rod, by powering different linearly spaced exciting coils and moving the melting zone with it as in U.S. Patent 2,719,799. With this method, the batch need not be of conducting material, and other materials, including organic compounds, may be subjected to progressive melting.

It is obvious that various changes and modifications may be made in the invention described herein without departing from the spirit and scope thereof.

We claim:

1. A method of producing a crystalline form of a mineral composition which comprises establishing a batch of particulate starting reactant compounds by supporting said batch of reactant compounds in an enclosure to form an aggregate mass of particulate reactant materials, heating an initial portion of said batch of reactant compounds within the interior of said aggregate mass to form by a chemical reaction a molten mass or melt of said mineral composition surrounded by sintered reaction compounds and unfused reactant compounds, said molten mass being confined to a melting zone within said aggregate mass, progressively passing the melting zone through the batch of reactant compounds of the aggregate mass by cooling said molten mass or melt, and internally heating a second portion of said batch of reactant compounds constituting sintered and unfused reactant compounds adjacent said cooling mass, and repeating the steps of heating and cooling successive adjacent further portions of the reactant compounds of said batch to form succeeding molten and subsequently cooled masses within said aggregate mass whereby the concomitant successive series of heated and cooled melts formed within the interior of the aggregate mass of reactant compounds crystallizes to produce relatively large crystals.

2. The method of claim 1, wherein the size of the melt is increased by injecting additional batch material directly into the molten mass at an early stage of the melting.

3. The method of claim 1, wherein the heating is electrical resistance heating.

4. The method of producing synthetic fluorine mica from particulate materials providing fluorine mica constituents which comprises establishing a batch of said particulate materials by supporting said batch of materials in an enclosure to form an aggregate mass of said particulate materials, heating an initial portion of said batch of materials from within the interior of said aggregate mass by electrical resistance heating to form by a chemical reaction a molten mass of fluorine mica surrounded by sintered material and unfused batch material, said molten mass being confined to a melting zone within said aggregate mass, progressively and stepwise passing the melting zone through the batch of materials of the aggregate mass by cooling said molten mass of fluorine mica and internally heating a second portion of the said batch of materials constituting sintered material and unfused batch material adjacent further portions of said batch materials to form succeeding subsequently cooled masses of fluorine mica whereby the successive series of heated and cooled melts of fluorine mica formed within the interior of the said aggregate mass crystallizes to produce relatively large crystals of fluorine mica.

5. A method for producing mineral crystals which comprises forming a batch of mineral ingredients for said crystals around a plurality of pairs of spaced electrode means including a first pair, said pairs of electrode means being linearly spaced from each other, at least the first pair of spaced electrode means being connected at the tips thereof by a destructible resistance element, starting a first conductive melt within the interior of the batch of materials along the said resistance element of the first pair of electrode means by electrical resistance heating of said element, continuing to melt said materials by electrical resistance heating between the said first pair of electrode means through said conducting melt after said destructible resistance element has burned out, the volume of the melt increasing thereby, said heating within the interior of the batch forming a thick shell of sintered batch material which acts as a vapor barrier, said melt defining a first melting zone, continuing the electrical resistance heating until the first melting zone is adjacent the immediately neighboring pair of fresh electrode means, discontinuing the heating between the first pair of electrode means, forming a second melting zone between the said immediately neighboring pair of electrode means by electrical resistance heating, thereby allowing at least a portion of said first melt to cool and crystallize, continuing the electrical resistance heating until the second melting zone is adjacent the next pair of fresh electrode means, and repeating the steps of discontinuing electrical resistance heating between the conducting pairs of electrode means and starting the electrical heating resistance in adjacent fresh electrode means pairs, whereby growth of mineral crystals is enhanced.

6. The method of crystallizing powdered and granulated material in a furnace having a chamber and a plurality of longitudinally spaced electrode means disposed within said chamber, comprising the steps of charging said chamber with said powdered and granulated material in contact with said electrode means, progressively and successively energizing said electrode means from one end of said chamber to the other to progressively melt said material from one end to the other, and progressively and successively deenergizing said electrode means from said one end to said other to progressively cool and crystallize said molten material from said one end to said other.

References Cited in the file of this patent
UNITED STATES PATENTS

| | | |
|---|---|---|
| 786,859 | Tone | Apr. 11, 1905 |
| 2,711,435 | Humphrey | June 21, 1955 |
| 2,719,799 | Christian | Oct. 4, 1955 |
| 2,739,088 | Pfann | Mar. 20, 1956 |
| 2,743,199 | Hull et al. | Apr. 24, 1956 |
| 2,923,754 | Worden | Feb. 2, 1960 |
| 3,009,788 | Daimon | Nov. 21, 1961 |

OTHER REFERENCES

Kendall: "Proceedings of International Congress of Pure and Applied Chemistry," pp. 167–170 (1947).